Figure 1:
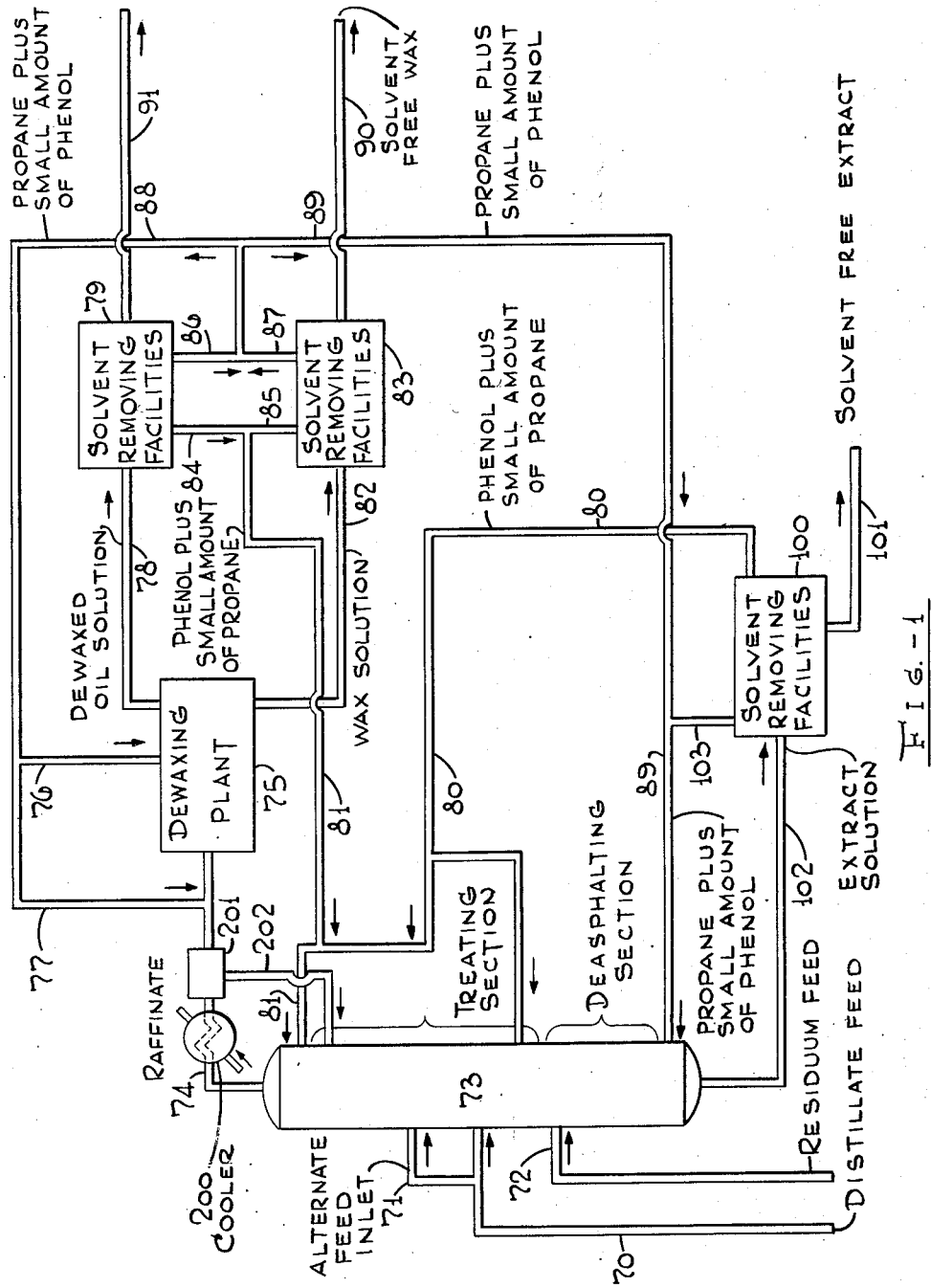
Figure 2:
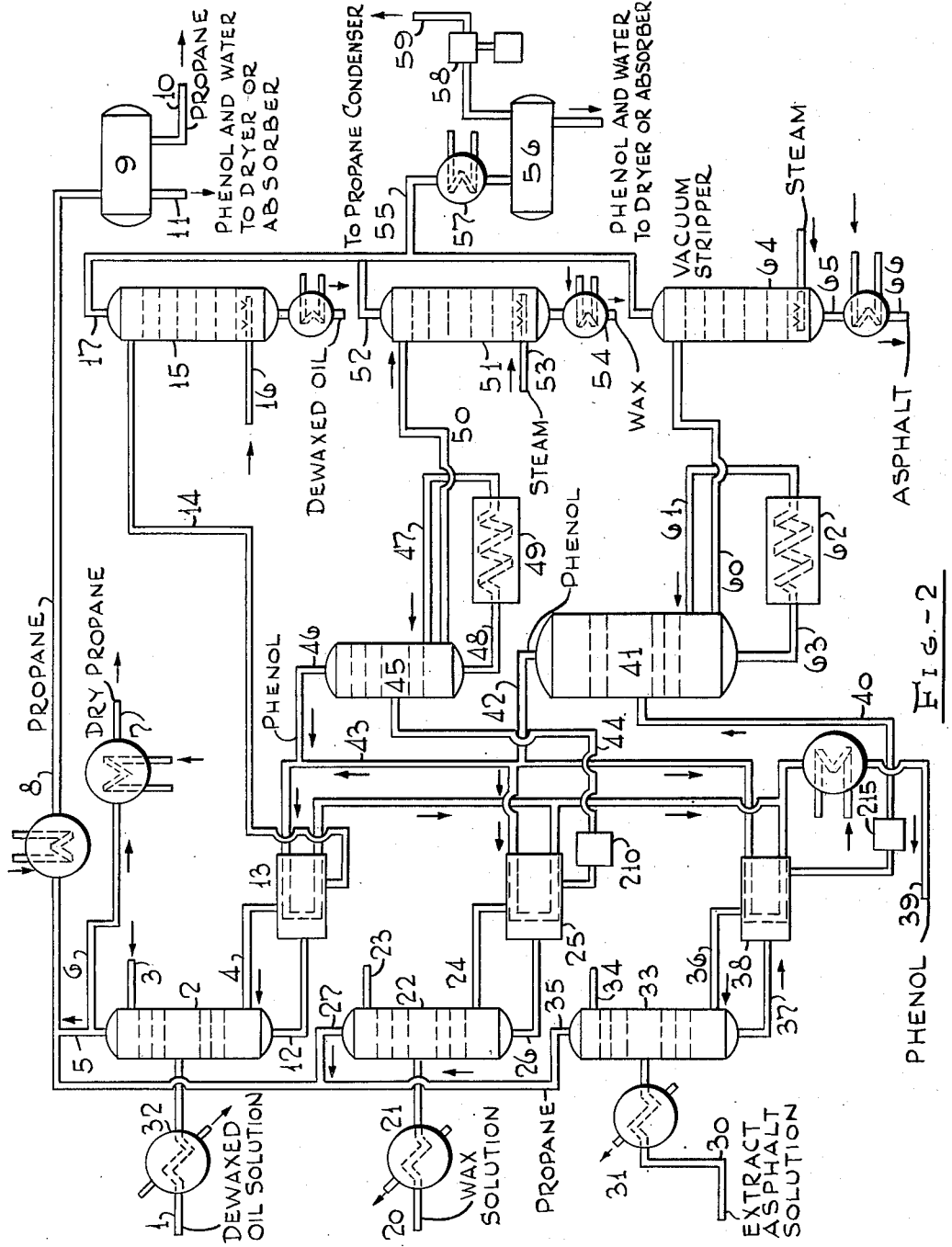

Patented Oct. 19, 1954

2,692,222

UNITED STATES PATENT OFFICE 2,692,222

COMBINATION, DEASPHALTING, PHENOL TREATING, AND DEWAXING PROCESS

John W. Packie, Maplewood, N. J., assignor to Standard Oil Development Company, a corporation of Delaware Application October 27, 1950, Serial No. 192,404

9 Claims. (Cl. 196—14.2)

The present invention is concerned with an improved deasphalting, phenol treating and dewaxing process. The invention is more particularly concerned with an improved lubricating oil operation wherein the processing steps of deasphalting, dewaxing and phenol treating are combined. In accordance with the specific adaptation of the present invention a distillate feed stream from a conventional vacuum flasher as well as a residuum from the vacuum flasher are separately introduced into a combination treater tower. The residuum is countercurrently treated with propane or an equivalent deasphalting solvent in the lower portion of the tower for deasphalting. The deasphalted stream passes up the tower being partially treated with phenol or an equivalent solvent before combining with the distillate feed for final quality improvement. The raffinate mixture containing phenol as well as propane passes directly to a conventional dewaxing plant. The effluent wax mixture from the dewaxing plant combines with the extract-asphalt solution before solvent recovery. The dewaxed oil mixture is separately processed for dewaxed oil recovery. The solvent recovery from this stream is partially integrated, in a novel fashion, with the solvent recovery from the extract-asphalt-wax solution. Propane is used for stripping phenol from the flashed oil streams.

It is well known in the art to treat feed oils, particularly distillate feed oils, with various solvents in order to separate the relatively more aromatic type constituents from the relatively more paraffinic type constituents. Solvents generally employed are phenol, various cresols, sulfur dioxide and the like. In these operations the feed oil is usually contacted with the selected solvent such as phenol either in a countercurrent treating operation or in a multi-stage batch operation under temperature and pressure conditions to secure phase separation. As a matter of practice, the oil to be treated is usually introduced into one end of a countercurrent treating zone while the solvent or solvent mixture is introduced at the other end. The solvent and oil flow countercurrently under temperature and pressure conditions whereby phase separation is secured. The solvent rich or solvent extract phase is withdrawn from one end of the countercurrent treating zone, while the solvent poor or the raffinate phase, comprising the more paraffinic type constituents, is withdrawn from the other end of the treating zone. The respective streams are then handled in a manner to segregate the solvent from the oil.

It is also known in the art to conduct a light hydrocarbon deasphalting process. In a process of this character, an oil phase or feed stream containing asphaltic type constituents is mixed with a light hydrocarbon solvent such as, for example, liquid propane under temperature and pressure conditions whereby the asphaltic type constituents are thrown out of solution. After separation of the asphaltic type constituents from the deasphalted oil, the respective streams are handled in a manner to recover the solvent.

It is also known in the art to remove waxy constituents from a paraffinic type oil containing the same in order to improve the quality of the oil. This is usually accomplished by employing a dewaxing solvent such as propane, methyl ethyl ketone or a similar dewaxing solvent. In operations of this type, the waxy oil and the solvent are usually heated to a temperature to secure a single phase or substantially complete miscibility of the ingredients. The waxy mixture is then chilled in order to precipitate wax particles or crystals from the solution. The chilled mass is filtered in order to seggregate the wax particles and further handled in a manner to recover the dewaxing solvent, and to further refine the dewaxed oil and the segregated waxes.

It has now been discovered that an improved combination process may be employed providing the respective feed streams are handled in a particular manner. The present invention may be readily understood by reference to the drawings illustrating one embodiment of the same. Figure I illustrates the operation with respect to the handling of the feed streams and the respective solvents. Figure II illustrates the operation particularly with respect to one method of handling the solvent recovery operations of the respective streams.

Referring specifically to Figure I, a distillate hydrocarbon feed is introduced into about the middle section of a combination treater zone 73 by means of line 70. If desired and under certain conditions it may be desirable to introduce the feed at a point between the middle third and upper third of zone 73 by means of line 71.

A residuum hydrocarbon feed is introduced into zone 73 by means of line 72 at a point between about the middle third and the lower third of the combination treater zone.

In accordance with the present invention, a solvent having a preferential selectivity for the more aromatic type constituents, as, for example, phenol, furfural, nitrobenzene, various organic nitrates, acetates and other esters, and the like, is introduced into the top of zone 73 by means of line 81. These so-called polar solvents may be used in admixture or modified by various modifying solvents such as water and the like. The preferred solvent comprises phenol. Also in accordance with the present invention it is preferred to introduce a portion of the phenol or equivalent solvent into approximately the middle of zone 73 by means of line 80.

A light hydrocarbon deasphalting solvent as, for example, a liquefied normally gaseous hydrocarbon such as propane, is introduced into the bottom of zone 73 by means of line 89. Under the conditions of operation a raffinate phase comprising paraffinic type constituents, a relatively large quantity of propane and a small amount of phenol or equivalent solvent is removed overhead from zone 73 by means of line 74. This stream, if desired, may be combined with additional propane which is introduced by means of line 77. In accordance with a preferred adaptation of the present invention the stream is passed through a cooling zone 200 into a separation zone 201 wherein phase separation occurs. The solvent-rich phase is withdrawn from separation zone 201 by means of line 202 and re-introduced into the top of zone 73 below the point of the introduction of the phenol stream which is introduced into zone 73 by means of line 81. The oil-rich phase is removed from separation zone 201 and introduced into a dewaxing zone 75.

Additional propane may be introduced into dewaxing zone 75 by means of line 76. This will be necessary providing autorefrigeration is employed in zone 75 in order to make up from the propane of equivalent solvent evaporated. The dewaxing zone may comprise any suitable number and arrangement of stages.

The dewaxed oil solution is removed from zone 75 by means of line 78 and passed to dewaxed oil solvent recovery facilities 79 in order to remove and recover the solvent from the dewaxed oil. A high quality dewaxed oil free of solvent is removed from the system by means of line 91 and further handled or refined as desired. A stream relatively rich in phenol is removed from zone 79 by means of line 84 while a stream relatively rich in propane is removed from zone 79 by means of line 86.

The wax solution segregated in zone 75 is removed by means of line 82 and passed to wax solvent removing facilities 83. A stream rich in phenol is removed by means of line 85 combined with the phenol stream removed from zone 79 by means of line 84 and then introduced into the top of zone 73 by means of line 81.

A stream relatively rich in propane is removed from zone 83 by means of line 87, combined with the propane removed from zone 79 by means of line 86 and segregated into two streams. One stream is employed to add additional propane to the raffinate phase removed overhead from zone 73 by means of line 74, while the remaining amount is recycled to the bottom of zone 73 by means of line 89. Waxes substantially free of solvent are removed from zone 83 by means of line 90 and further handled or refined as desired.

A solvent extract phase comprising asphaltic constituents is removed from the bottom of zone 73 by means of line 102 and introduced into solvent removing facilities 100. A stream rich in phenol or equivalent solvent is removed from zone 100 by means of line 80 and recycled to the top of zone 73. A stream rich in propane is removed from zone 100 by means of line 103 and combined with a propane stream segregated in zone 79 and 83 and recycled to the bottom of treating zone 73. A solvent free extract is removed from zone 100 by means of line 101 and further handled or refined as desired.

The above description with respect to Figure I comprises one embodiment of the invention wherein a single deasphalting and solvent treating zone is utilized and wherein the dewaxing operation is combined with the other processing steps. The method of handling the solvent from the respective streams in a manner to efficiently recover and utilize the same is illustrated by Figure II. Referring specifically to Figure II, the dewaxed oil solution introduced into dewaxed oil solvent recovery zone 79 is introduced through line 1, passed through a heat exchanging zone 72 in order to heat the same, and then introduced into a propane recovery tower 2 or equivalent means. Temperature and pressure conditions are adjusted to remove overhead from the propane recovery tower 2 a propane stream. A portion of this stream is segregated by means of line 6, which comprises a dry propane stream. The remaining propane is passed through line 5 and handled as hereinafter described. The anhydrous propane segregated by means of line 6 is subsequently employed to wash the wax cake on the filters.

Reflux propane segregated from any desirable source is introduced into the top zone 2 by means of line 3. An oil solution comprising oily constituents and phenol is removed from the bottom of zone 2 by means of line 12, and passed to a reboiler means 13. A portion of this stream is recycled to the bottom of zone 2 by means of line 4 in order to maintain the desired bottom temperature while the remaining amount is introduced into the top of the phenol recovery tower or zone 15 by means of line 14.

The dewaxed oil containing phenol flows downwardly in zone 15 and countercurrently contacts upflowing steam or equivalent stripping vapors which is introduced by means of line 16. A dewaxed oil free of phenol and propane is removed from the bottom of zone 15 and further handled or refined as desired. Phenol containing a small amount of propane is removed overhead from zone 15 by means of line 17 and passed through a condensing zone 57 by means of line 55. The mixture is passed to a separation zone 56 wherein the condensed phenol is removed by means of line 205. The vaporous propane is removed overhead from zone 56, passed through a compressor 58, and then withdrawn by means of line 59. This stream of propane is recycled to the system by means of lines 88 and 89 as shown in Figure I.

The phenol withdrawn from the bottom of separation zone 56 by means of line 205 is introduced in the top of zone 73 by means of line 81. The dewaxed oil removed from the bottom of zone 15 is identical with the stream removed from zone 79 by means of line 91. The propane removed by means of line 5 is condensed and passed to separation zone 9 wherein a phase separation occurs between aqueous phenol and propane. The aqueous phenol is passed to a drier while the propane is recycled to the system by means of lines 88 and 89 as shown on Figure I.

The wax solution removed from dewaxing plant 75 by means of line 82 is passed into solvent recovery facilities 83 by means of line 20. The wax solution is heated in a heating zone 21 and then introduced into the center of a propane recovery tower 22.

A stream rich in propane is removed overhead from zone 22 by means of line 27, combined with the overhead stream from zone 2 by means of line 5, cooled in zone 201, and introduced into a separation zone 9. Propane is removed by means of line 10 and handled as hereinbefore described. Reflux propane is introduced into zone 22 by means of line 23.

The waxy solution is removed from the bottom of zone 22 by means of line 26 and passed to a reboiler 25. A portion of the waxy solution is recycled to the bottom of zone 22 by means of line 24 to maintain bottom temperature while the remainder is withdrawn by means of line 44 and preferably introduced into a secondary propane removal tower or zone 210. Temperature and pressure conditions in zone 210 are adapted to remove the final traces of the propane from the wax. The waxy solution substantially completely free of propane is then introduced into phenol recovery zone 45 by means of line 44. The temperature and pressure conditions in zone 45 are adapted to remove overhead a phenol stream by means of line 46. This stream is passed in heat exchange in reboilers 13 and 25, and withdrawn from the recovery system by means of line 39. This phenol stream is then recycled to zone 73 by means of line 81 as shown in Figure I.

The wax substantially free of phenol is removed from zone 45 by means of line 48, passed to reboiler 49 and returned to zone 45 by means of line 47 to maintain the desired bottoms temperature. The wax stream is removed from zone 45 by means of line 50 and introduced to the top of phenol remover zone 51. The stream flows downwardly in zone 51 and countercurrently contacts upflowing steam which is introduced by means of line 53. A wax product is removed from the bottom of zone 51, passed through heat exchanger 54, and withdrawn from the system and further handled as desired. This wax stream corresponds to the wax stream removed by means of line 90, Figure I. Phenol is removed overhead from zone 51 by means of line 52 and combined with the stream removed from zone 15 by means of line 17 and handled as hereinabove described.

The extract solution introduced into solvent removing facilities 100 by means of line 102 is handled by means of line 30, passed through a heat exchanging zone 31 and introduced into the center section of a propane stripping zone 33. A propane stream is removed overhead from zone 33 by means of line 35 and combined with the propane removed overhead from zone 22 by means of line 27 and from zone 2 by means of line 5, and handled as hereinbefore described.

An asphalt phase is removed from the bottom of zone 33 by means of line 37 and passed to a reboiler 38. A portion of this phase is reintroduced into zone 33 by means of line 36 to maintain bottoms temperature.

The asphalt phase is removed from the bottom of reboiler 38 by means of line 40 and introduced into a secondary propane removing stage 215. Temperature and pressure conditions are adapted to remove overhead from zone 215 propane which is recycled to the system. The asphalt phase is removed from zone 215 and introduced into phenol recovery zone 41 by means of line 40. A phenol stream is removed from the top of zone 41 by means of line 42 and removed from the system by means of line 39 after passing in heat exchange in reboilers 25 and 38, as well as in reboiler 13. As described hereinbefore, this phenol stream is recycled to zone 73 by means of line 81.

A portion of the asphalt phase is withdrawn from the bottom of zone 41 by means of line 63, passed through heating zone 62 and then introduced into zone 41 by means of line 61 to maintain bottoms temperature. The asphalt phase is withdrawn from the bottom of zone 41 by means of line 60 and introduced into the top of a vacuum stripper 64 in order to remove the final traces of phenol.

Phenol is removed overhead from zone 64 by means of line 216 combined with the stream removed overhead from zones 15 and 51 and handled as hereinabove described. Steam is introduced into the bottom of zone 64 in order to strip the remaining traces of phenol from the asphalt which is removed by means of line 55 and passed through a heating zone 66. This stream corresponds to the stream removed by means of line 101 of Figure I.

The invention is broadly concerned with an improved method for refining petroleum oils boiling in the lubricating oil boiling range. In accordance with the present invention a crude oil is processed through a vacuum flasher zone rather than through a conventional pipestill or equivalent means wherein a sharp separation is secured. Normally it is preferred to process in the vacuum flasher 20 to 40% of the highest boiling crude bottoms. For example, if 35% crude bottoms (atmospheric pressure) is processed, this stream is heated to a temperature in the range of 750 to 800° F. and then flashed in the vacuum flasher at a pressure in the range of 50 to 200, preferably at about 100 millimeters absolute pressure. Under these conditions a distillate fraction boiling in the range of about 600 to 1100° F. is segregated from a residuum fraction boiling above about 900° F.

The two said streams from the vacuum flasher are separately introduced into the combination treater tower. The residuum is countercurrently treated with propane or an equivalent solvent in the lower portion of the tower for deasphalting. The bright stock passes up the tower being partially phenol treated before combining with the distillate feed for final quality improvement.

In accordance with the present invention vacuum residuum and wide-cut lube distillate feed stocks are pumped into a combination propane deasphalting and phenol treating tower. The residuum is separately introduced in the lower portion of the tower being countercurrently contacted with propane for deasphalting. The raffinate from the residuum, i. e., bright stock, passes upward, countercurrent to a phenol bearing distillate extract from the upper portion of the tower. The bright stock is thereby partially phenol treated subsequent to deasphalting. The quality-improved bright stock then passes into the distillate-phenol treating portion of the tower where it combines with distillate to be further countercurrently treated with phenol. The extract from the tower contains most of the phenol in solution with propane, propane rejected asphalt, and the low-quality phenol extracted oil. The raffinate contains most of the propane with quality-improved oil in solution with soluble phenol.

The raffinate solution is sent directly to a propane dewaxing plant. The phenol in the raffinate acts as a wax diluent or solvent, the majority of it passing out of the system in the wax mixture from the filters.

For the operations of deasphalting, dewaxing, and phenol treating, only three solvent-bearing streams must be processed in recovery equipment. These are the dewaxed oil mixture, the wax mixture, and the asphalt-extract mixture. If wax is not required as a separate product, the wax mixture and the asphalt-extract mixture are combined for solvent recovery.

The temperatures and pressures utilized in the combination treater zone may vary appreciably depending upon the characteristics of the respective streams being processed. In general it is preferred that the temperatures be in the range of about 50° F. to 200° F. and pressures in the range of 100 to 500 lbs. per square inch gauge be utilized. A satisfactory temperature is about 120° F. while a satisfactory pressure is about 250 lbs. per square inch gauge.

Although phenol is preferred as the solvent, other equivalent solvents may be utilized. In general the solvent should be selected from that class of solvents having a preferential selectivity for the relatively more aromatic type constituents as compared to the relatively more paraffinic type constituents. Mixtures of these solvents as well as solvent modifying agents such as water and the like may be utilized. In general the amount of phenol introduced into the top of the treater may range from about .5 to 5 volumes of phenol per volume of oil. A desirable solvent to oil ratio is in the range of about 1:1. The amount of phenol introduced in the center of the treater likewise may vary appreciably. In general it should be approximately half the amount introduced at the top of the zone.

Any suitable deasphalting solvent may be used other than propane although propane or a solvent comprising propane is desirable. The quantity of propane utilized based on the quantity of total feed is from 3 to 15 volumes of propane per volume of feed. A satisfactory amount is about 6 volumes of propane per volume of feed.

The raffinate stream removed overhead from zone 73 will vary appreciably in composition, generally having a relatively large amount of propane present. Under suitable conditions of operation this raffinate stream may comprise about one volume of oil, ½ volume of phenol and about 5 volumes of propane. In accordance with the preferred embodiment of the invention this stream is cooled to about 90° F. in order to secure the separation of a phenol rich phase which is returned to zone 73 as described. The oil phase is then passed to a dewaxing zone wherein the same is cooled at a predetermined rate in order to precipitate wax crystals. These crystals are removed from the oil preferably by filtering or other equivalent means. Generally, the waxy oil is cooled to a temperature in the range of 20° F. to −50° F. or lower in order to secure satisfactory precipitation of the wax crystals.

The extract solution removed from the bottom of the treating zone will also vary appreciably in composition. A typical composition of this stream comprises one volume of oil, about 2 volumes of phenol and about 3 volumes of propane.

As described, the solvent recovery facilities for the dewaxed oil, the wax solution and the solvent extract solution are interrelated in a manner to secure improved solvent recovery. The dewaxed oil solution rich in propane and containing a relatively small amount of phenol is processed by means of a phenol recovery zone and a propane recovery zone. The propane is removed in an initial zone, the pressure of which will vary from 100 to 300 lbs. and higher while the temperature may vary from 200° to 400° F. A desirable operating condition for the propane recovery zone for the dewaxed oil is a temperature of about 375° F. (bottoms) and a pressure of about 200 lbs. per square inch. The top temperature will vary from about 120° to 160° F.

The phenol recovery zone for the dewaxed oil solution may be operated under various temperature and pressure conditions. One mode of operation is to maintain a pressure of about 25 to 100 millimeters (absolute) and a temperature of about 375° F. This temperature, of course, may be varied appreciably as, for example, in a range of about 300° to 500° F. if desired.

The wax solution is handled preferably by processing in two propane recovery zones followed by two phenol recovery zones. The temperatures and pressures maintained in the respective zones may be varied appreciably depending on other operating conditions. One mode of operating the initial propane recovery zone is to maintain a pressure of about 200 lbs. per square inch and a temperature in the range of 350° to 425° F. A satisfactory temperature comprises about 375° F. The secondary propane recovery zone may be operated at substantially the same temperature but at a somewhat lower pressure as, for example, about 0 to 50 p. s. i. g. The initial phenol recovery zone for the wax solution is preferably operated under a pressure of 25 to 50 lbs. gauge with a top temperature in the range of about 420° to 430° F. and at a bottom temperature of about 550° F. The conditions on the secondary phenol recovery are similar to the conditions employed with respect to the dewaxed oil solution. The pressures are in the neighborhood of 25 to 100 millimeters (absolute) while the temperature is in the range of about 350° to 400° F.

The extract-asphalt solution is handled by preferably processing through two propane recovery stages and two phenol recovery stages. The operating temperatures and pressures with respect to these stages are similar to the operating temperatures and pressures employed with respect to the recovery of propane and phenol from the wax solution as given above.

The propane streams removed from the respective recovery unit are combined as well as the phenol streams and handled in a manner as described. This results in unexpected operating advantages and the production of high quality products.

Having described the invention, it is claimed:

1. Process for the production of a high quality lubricating oil from a distillate hydrocarbon oil and a higher boiling residuum oil secured from a distillation operation and containing asphaltic constituents which comprises introducing the distillate oil into the center area of a liquid-liquid extraction-treater zone, introducing the residuum oil into the extraction-treater zone below the point of introduction of the distillate oil, introducing a solvent having a preferential selectivity for aromatic type constituents as compared to paraffinic type constituents into the upper area of said extraction-treater zone, introducing a deasphalting solvent into the lower area of said extraction-treater zone below the point of introduction of said residuum oil, withdrawing a solvent extract phase from the bottom of said extraction-treater zone and separating asphaltic constituents therefrom, withdrawing a raffinate phase comprising paraffinic type constituents from the top of said solvent treater zone and separating a high quality lubricating oil therefrom.

2. Process as defined by claim 1 wherein a portion of the solvent having a preferential selectivity for the more aromatic type constituents as compared to the more paraffinic type constituents is introduced into said extraction-treater zone at a point between the point of introduction of said distillate oil and said residuum oil.

3. Process as defined by claim 2 wherein said solvent having a preferential selectivity for said aromatic type constituents as compared to paraffinic type constituents comprises phenol and wherein said deasphalting solvent comprises liquefied propane.

4. Process as defined by claim 3 wherein said raffinate phase withdrawn from the top of said extraction-treater zone is treated with said propane in a manner to remove waxy constituents therefrom.

5. Process as defined by claim 1 wherein said distillate hydrocarbon oil and said residuum oil are secured by vacuum flashing a crude oil in a manner to segregate a distillate oil and a residuum oil.

6. Process as defined by claim 5 wherein said distillate oil boils in the range from about 600° F. to 1100° F. and wherein said residuum oil boils above about 900° F.

7. Process as defined by claim 1 wherein said raffinate phase withdrawn overhead from said extraction-treater zone is cooled whereby a solvent rich phase separates, reintroducing said solvent rich phase into said extraction-treater zone at a point below the point of introduction of said solvent having a preferential selectivity for the relatively more aromatic type constituents as compared to the relatively more paraffinic type constituents.

8. Process as defined by claim 1 wherein said raffinate phase removed overhead from said extraction-treater zone is handled in a manner to segregate a dewaxed oil and a waxy solution, and wherein said streams as well as the extraction solution stream removed from the bottom of said extraction-treater zone are handled to segregate the solvent having a preferential selectivity for the more aromatic type constituents which streams segregated are combined and recycled to said extraction-treater zone, and wherein the deasphalting solvent is segregated from the respective streams combined and recycled to the bottom of said extraction-treater zone.

9. Process as defined in claim 8 wherein said deasphalting solvent comprises propane and wherein said solvent having a preferential selectivity for the more aromatic type constituents comprises phenol.

References Cited in the file of this patent

UNITED STATES PATENTS

| Number | Name | Date |
| --- | --- | --- |
| 2,017,432 | Bahlke | Oct. 15, 1935 |
| 2,079,886 | Voorhees | May 11, 1937 |
| 2,086,487 | Bahlke et al. | July 6, 1937 |
| 2,121,323 | Manley et al. | June 21, 1938 |
| 2,139,392 | Tijmstra | Dec. 6, 1938 |
| 2,215,359 | Livingston et al. | Sept. 17, 1940 |
| 2,225,396 | Anderson | Dec. 17, 1940 |
| 2,248,067 | Davis | July 8, 1941 |
| 2,258,279 | Caselli et al. | Oct. 7, 1941 |
| 2,270,827 | Tijmstra | Jan. 20, 1942 |